United States Patent
Kweon et al.

(10) Patent No.: US 6,925,313 B2
(45) Date of Patent: Aug. 2, 2005

(54) FOLDER-TYPE MOBILE COMMUNICATION TERMINAL HAVING DOUBLE-SIDED LCD

(75) Inventors: Hyug Man Kweon, Seoul (KR); Byoung Gon Lee, Seoul (KR)

(73) Assignee: Hyundai Curitel Inc. (KR)

( * ) Notice: Subject to any disclaimer, the term of this patent is extended or adjusted under 35 U.S.C. 154(b) by 429 days.

(21) Appl. No.: 10/071,750

(22) Filed: Feb. 6, 2002

(65) Prior Publication Data

US 2002/0111195 A1 Aug. 15, 2002

(30) Foreign Application Priority Data

Feb. 7, 2001 (KR) .......................................... 2001-5888
Jan. 10, 2002 (KR) .......................................... 2002-1414

(51) Int. Cl.⁷ ................................................ H04Q 7/20
(52) U.S. Cl. ...................... 455/566; 455/550.1; 362/31; 362/27; 362/102; 349/143; 345/102
(58) Field of Search ........................ 455/566; 349/143; 362/31, 555, 27; 345/102

(56) References Cited

U.S. PATENT DOCUMENTS

| | | | |
|---|---|---|---|
| 5,883,684 A | 3/1999 | Millikan et al. | |
| 5,940,215 A | 8/1999 | Rudisill et al. | |
| 6,466,292 B1 | * 10/2002 | Kim | ............................ 349/143 |

FOREIGN PATENT DOCUMENTS

| | | | | |
|---|---|---|---|---|
| EP | 0984314 A2 | 3/2000 | | |
| GB | 2192084 | 3/1987 | | |
| GB | 2343324 | 10/1999 | | |
| GB | 2343324 | * 3/2000 | ............ | H04M/1/02 |
| JP | 59-208577 | 11/1984 | | |
| JP | 62-184528 | 8/1987 | | |
| JP | 4-329516 | 11/1992 | | |
| JP | 6-243826 | 9/1994 | | |
| JP | 9-181801 | 7/1997 | | |
| JP | 10-199317 | 7/1998 | | |
| JP | 2001-67049 | 7/2002 | | |
| JP | 2002-189230 | 7/2002 | | |
| WO | WO 00/59179 | 5/2000 | | |
| WO | WO 00/59179 | * 10/2000 | ............ | H04M/1/02 |

* cited by examiner

*Primary Examiner*—Nick Corsaro
*Assistant Examiner*—Alan T. Gantt
(74) *Attorney, Agent, or Firm*—Blakely Sokoloff Taylor & Zafman

(57) ABSTRACT

A folder-type mobile communication terminal having a double-sided LCD includes a first LCD panel, a second LCD panel, and a backlight device, which is interposed between the first and second LCD panels, for bi-directionally illuminating the first and second LCD panels, wherein the backlight device includes a light emitting diode for emitting light and a light guide plate for distributing the light emitted from the light emitting diode to the first and second LCD panels.

9 Claims, 6 Drawing Sheets

FOLDER-TYPE MOBILE COMMUNICATION TERMINAL HAVING DOUBLE-SIDED LCD

FIELD OF THE INVENTION

The present invention relates to a mobile communication terminal; and, more particularly, to a mobile communication terminal in a type of folder.

DESCRIPTION OF RELATED ART

Generally, a mobile communication terminal can be used to communicate with the other person independent of an area and, recently, the number of subscribers is rapidly increased. There are provided different communication services using mobile terminals, such as a cellular phone, a personal communication service (PCS) phone, next-generation mobile communication terminals of IMT-2000 (international mobile telecommunication) and UMTS (universal mobile telecommunication service), a PDA (personal digital assistants) phone and another portable mobile communication phones.

FIG. 1 is a perspective view showing a folder-type mobile communication terminal.

Referring to FIG. 1, a terminal is constructed with many kinds of electronic parts and an antenna positioned at an upper portion thereof. The terminal includes a main body 10A having a keypad 11 capable of dialing and calling on/off the numbers by pushing buttons at a front side and a flip 10B connected to the main body 10A with hinges to open/shut the keypad 11. The flip 10B equips a liquid crystal display (LCD) 12 to display an operation state when the button is pushed in the keypad 11. A speaker 13A is equipped at an upper side of the flip 10B and a microphone 13B is equipped at a lower side of the keypad 11. Also, in order to supply power to the internal circuit of the terminal 10, a detachable battery pack 14 is equipped at a rear side of the main body 10A.

In this mobile communication terminal 10, since the LCD 12 is not a luminous device, it is inconvenient to use it at a dark place so that a backlight, which can uniformly illuminate the LCD, is equipped to be used at the dark place. If a lamp equipped at a lateral or rear side of the LCD 12 is turned on, the light is illuminated to the LCD 12 so that images can be seen at a dark place.

FIG. 2A is a perspective view showing a folder-type mobile communication terminal having a double-sided LCD.

Referring to FIG. 2A, the terminal 20 includes a main body 20A and a flip 20B. The main body 20A includes a detachable battery pack 24 and an antenna 28 and the flip 20B includes two LCD panels 22A (not shown) and 22B. The flip 20B is connected to the main body 20A with hinge 26 to open/shut a keypad (not shown) of the main body 20A.

FIG. 2B is a cross-sectional view illustrating the flip 20B in FIG. 2A having a backlight in the terminal of a double-sided LCD.

Referring to FIG. 2B, the flip 20B includes an electro-luminescent (EL) backlight 123 for illuminating a outside LCD panel 22B, a light guide plate 125 to transmit the light emitted from a light source (not shown), such as a LED or the like, into an inside LCD panel 22A and a LCD printed circuit board (PCB) 124 for controlling power of the electro-luminescent backlight 123 and for driving the LCD panels 22A and 22B. Also, the flip 20B includes double-sided tapes 126 and 127 for adhering the printed circuit board (PCB) 124 to one side of the electro-luminescent backlight 123 and adhering the electro-luminescent backlight to one side of the outside LCD panel 22B.

As mentioned the above, since the flip 20B includes the LED and the light guide plate 125 for backlighting the inside LCD panel 22A and the EL backlight 123 for backlighting the outside LCD panel 22B, there are problems that a thickness of the flip 20B becomes thick and a fabricating process is complex so that a fabricating cost is increased.

SUMMARY OF THE INVENTION

It is, therefore, an object of the present invention to provide a dual LCD device of a mobile communication terminal of a folder type having a backlight capable of emitting light into inside and outside LCD panels with one light source at the same time.

In accordance with an aspect of the present invention, there is provided a folder-type mobile communication terminal having a double-sided LCD, comprising: a first LCD panel; a second LCD panel; and a backlight means, which is interposed between the first and second LCD panels, for bi-directionally illuminating the first and second LCD panels, wherein the backlight means includes: a light emitting means for emitting light; and a light guide plate for distributing the light emitted from the light emitting means to the first and second LCD panels.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Hereinafter, a folder-type mobile communication terminal having a double-sided LCD according to the present invention will be described in detail referring to the accompanying drawings.

Generally, a mobile communication terminal is constructed with many kinds of electronic parts and an antenna positioned at an upper portion thereof. The terminal includes a main body having a keypad capable of dialing and calling on/off the numbers by pushing buttons at a front side and a flip connected to the main body with hinges to open/shut the keypad. The flip equips a liquid crystal display (LCD) to display an operation state when the button is pushed in the keypad. A speaker is equipped at an upper side of the flip and a mike 13B is equipped at a lower side of the keypad. Also, in order to supply power to the internal circuit of the terminal, a detachable battery pack is equipped at a rear side of the main body.

Figure 1:
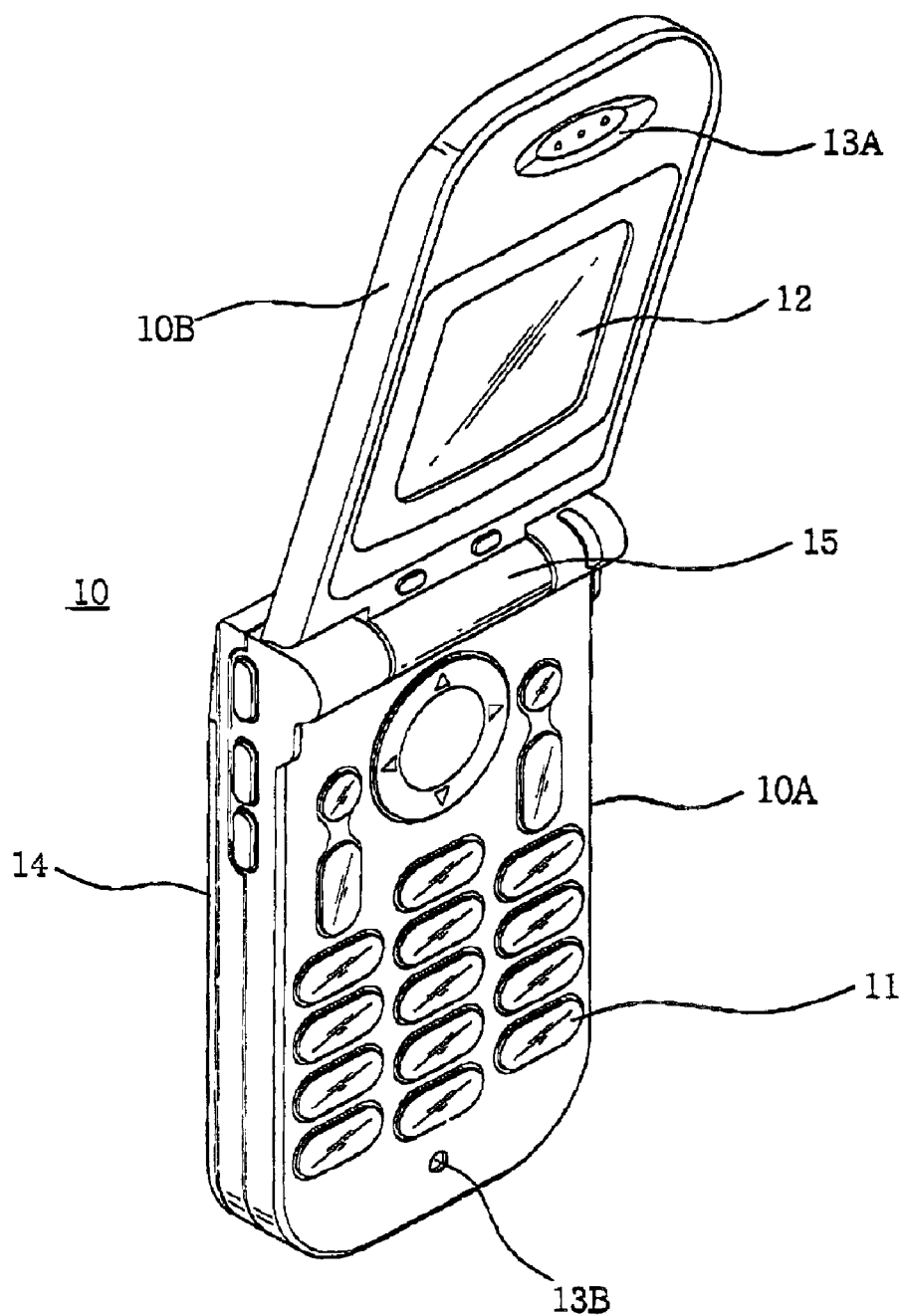
FIG. 1 is a perspective view showing a mobile comnmunication terminal of a folder type.
Figure 2A:
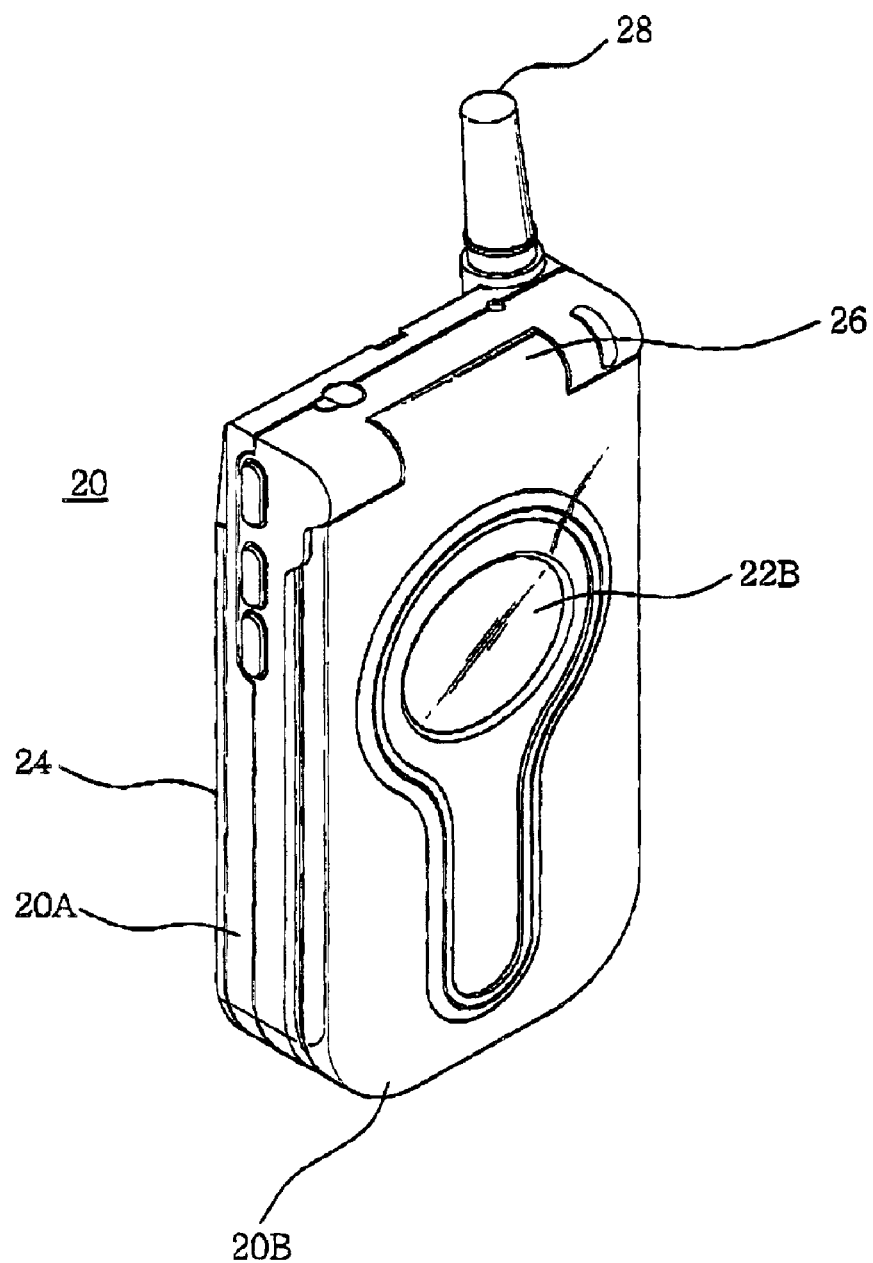
FIG. 2A is a perspective view showing a folder-type mobile communication terminal having a double-sided LCD according to the prior art.
Figure 2B:
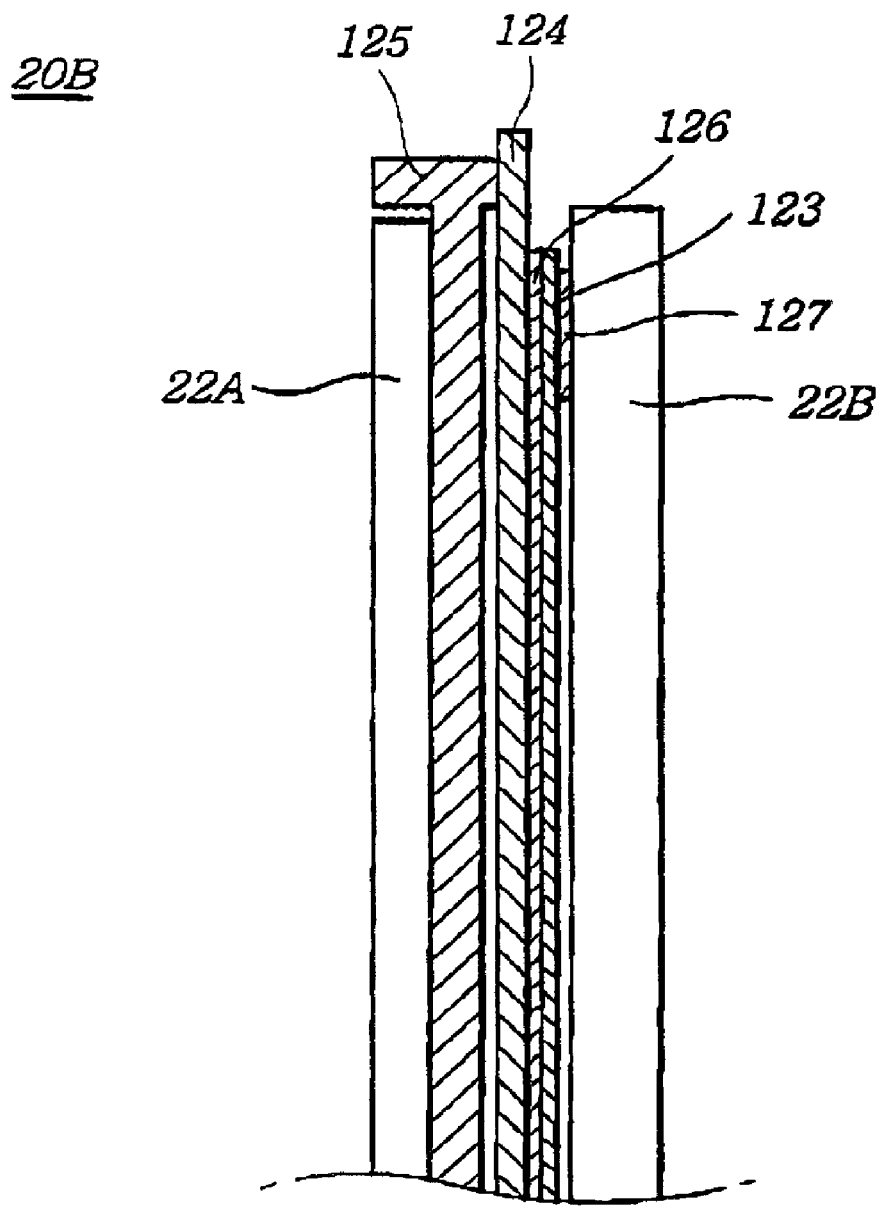
FIG. 2B is a cross-sectional view illustrating the flip in FIG. 2A having a backlight in the terminal of a double-sided LCD according to the prior art.
Figure 3:
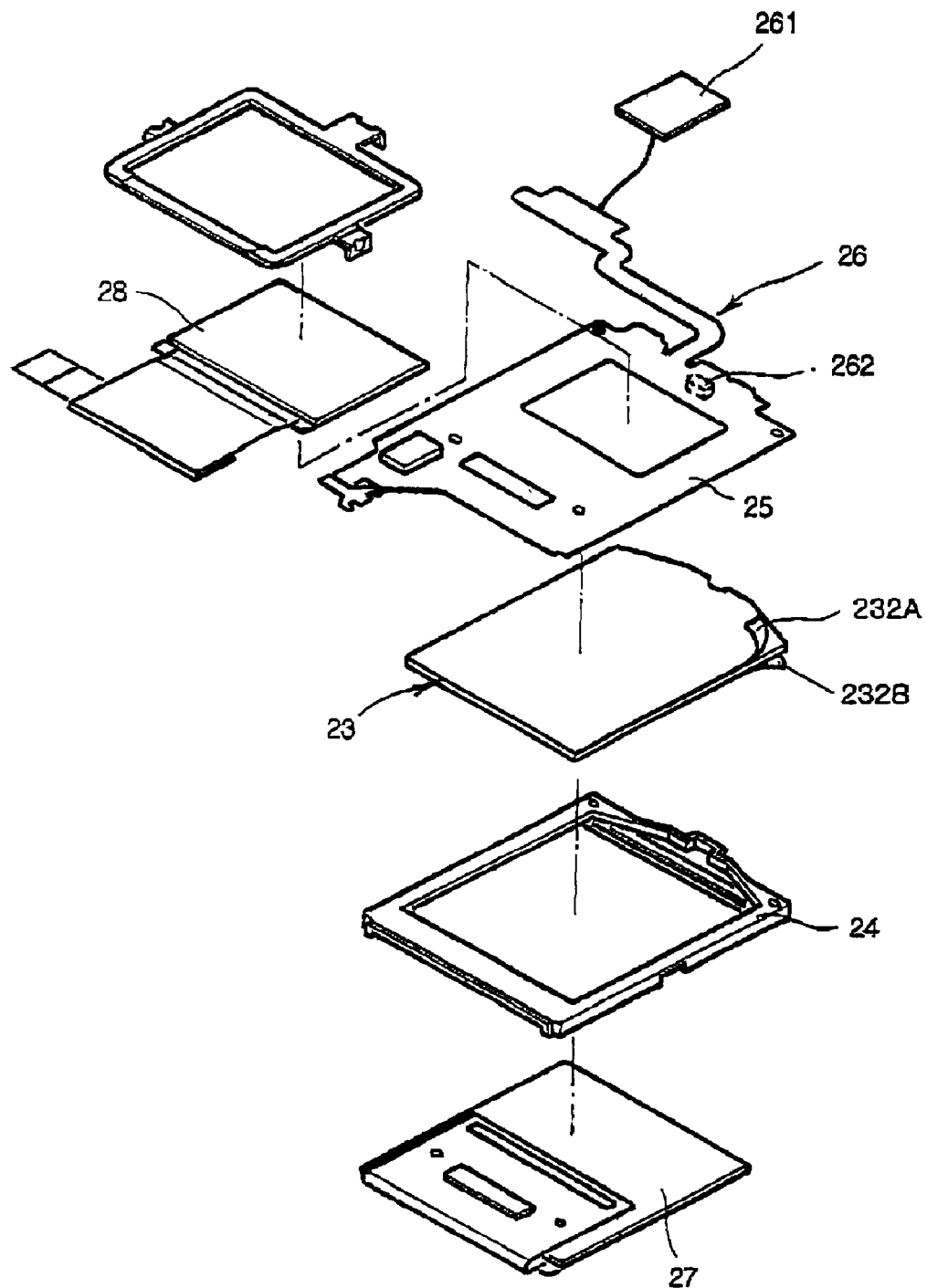
FIG. 3 is an exploded perspective view illustrating a dual LCD device according to the present invention.

FIG. 3 is an exploded perspective view illustrating a double-sided LCD having a backlight in a mobile communication terminal according to the present invention.

Figure 4:
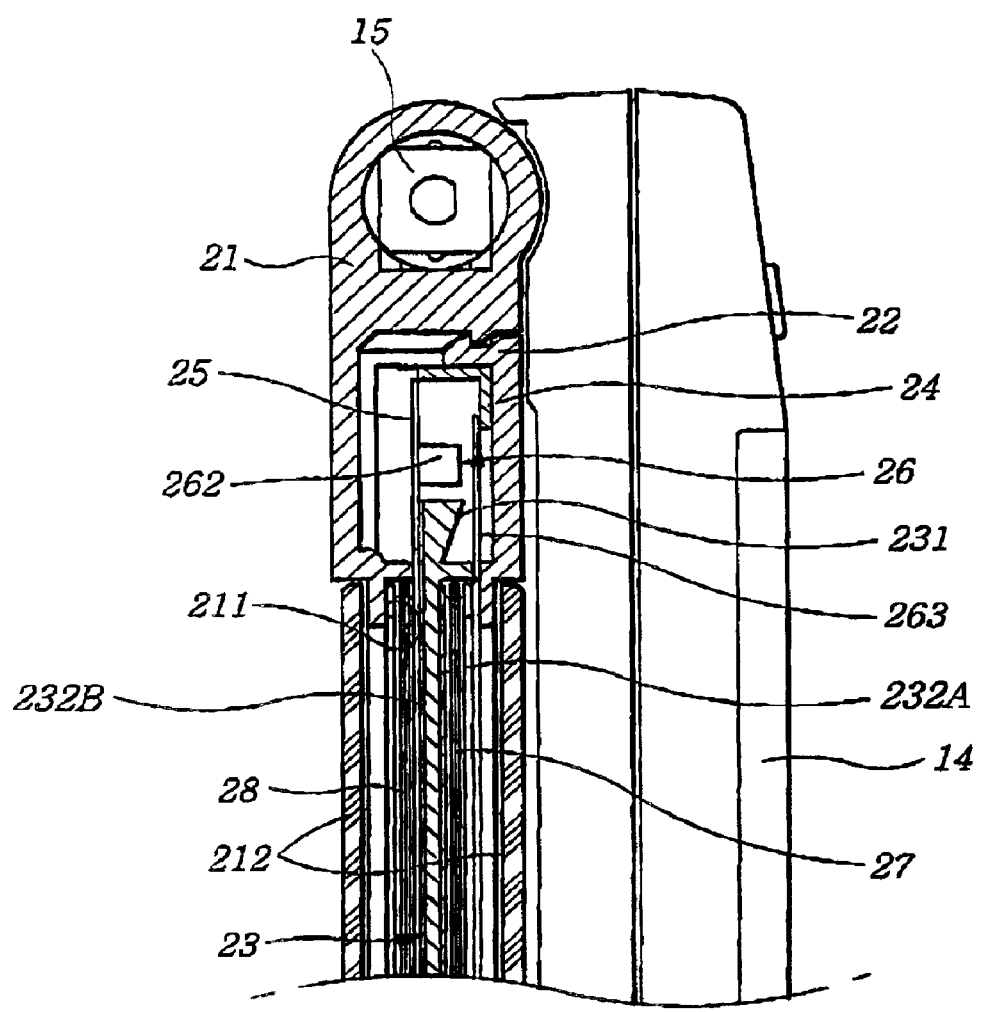
FIG. 4 is a vertically cross-sectional view illustrating a folder-type mobile communication terminal having a double-sided LCD according to the present invention.
Figure 5:
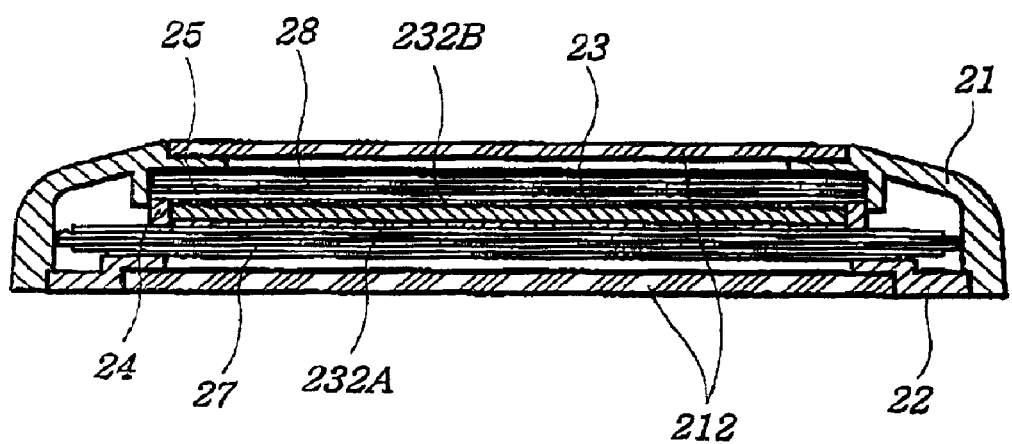
FIG. 5 is a horizontally cross-sectional view illustrating a flip of the mobile communication terminal having a double-sided LCD according to the present invention.

FIGS. 4 and 5 are cross-sectional views illustrating the terminal according to the present invention.

Referring to FIGS. 3 to 5, a flip of a folder-type mobile communication terminal having the double-sided LCD includes a light source 262, such as a light emitting diode (LED) or the like, for emitting light by supplying power and a backlight for bi-directionally transmitting and illuminating the light emitted from the LED light source 262. Two LCD panels 27 and 28 of inside and outside of the flip are symmetrically equipped with the backlight in the center. A first and a second translucent films 232A and 232B act as a light diffusing material to enhance the uniformity of the light distribution. The first translucent film 232A is disposed between one plane of the light guide plate 23 and the LCD panel 27 for uniformly transmitting the light to the LCD panel 27. The second translucent film 232B is disposed between the other plane of the light guide plate 23 and the LCD panel 28 for uniformly transmitting the light to the LCD panel 28. A light transmissivity of the first translucent film 232A is higher than that of the second translucent film 232B.

Also, the flip has a power control unit to simultaneously and selectively control power of the two LCD panels 27 and 28 according to opening/shutting of the flip of the mobile communication terminal.

The backlight is to illuminate the outside/inside LCD panels 27 and 28 with the light emitted from the LED 262. The flip includes a light guide plate 23 for transmitting light emitted from the LED 262, a holder formed in an inside of an upper case 21 of the flip to hold edges of the light guide plate 23, a flexible printed circuit board (PCB) 25 attached to the upper portion of the holder 24 and a light emitting unit 26 connected to the flexible PCB 25 for bi-directionally emit light. At this time, the light emitted from the light emitting unit 26 illuminate the LCD panels 27 and 28 at the same time.

More concretely, a light collecting unit 231 formed with an inclination of a predetermined angle for collecting light is formed at an upper portion of the light guide plate 23 and a translucent fluorescent films 232A and 232B are attached at both sides of the light guide plate 23. Accordingly, the light guide plate 23 acts as a bidirectional distributor of light collected at the light collection unit 231 to the inside and outside LCD panels 27 and 28.

The light emitting unit 26 has a control unit 261 to control an operation by power supplied from the battery pack 14. Light of a LED is turned on/off by the control unit 261 and a light shielding layer 263 shields that the light emitted from the LED 262 is transmitted into exterior. The LED has a light emitting device capable of emitting tree colors (R, G and B) at the same time.

Referring to FIGS. 4 and 5, the light guide plate 23 is inserted in the holder 24 and the inside LCD 27 is attached at a lower plane of the light guide plate 23 and the flexible PCB 25 is attached at an upper plane of the light guide plate 23 and then the inside LCD 27 and the flexible PCB 25 are fixed with the holder 24 and a fixing unit (not shown). The outside LCD 28 is attached at a front plane of the flexible PCB 25 and the LED light source 262 is connected to the flexible PCB 25.

In order to shielding that the light emitted from the LED light source 262 is transmitted into an exterior, the light shielding layer 263 is fixed at an upper portion of the holder 24 capable of accepting the upper portion of the LED 262.

The light guide plate 23, which is to fix the inside and outside LCD panels 27 and 28 or the like, is joined at an inside of the holder 24 and then is fixed at a fixing part 211 of an upper case 21. Also, the light collecting unit 231 formed on the upper side of the light guide plate 23 is fixed at an inside of the holder 24. The out-side LCD panel 28 is fixed into the fixing groove 211 of the upper case 21 and the inside LCD panel 27 is fixed into the inside of the holder 24. Also, the holder 24 is fixed into the inside of the upper case 21.

A lower case 22 is joined to the upper portion ot the upper case 21 to prevent that the light guide plate 23, which is fixed at the holder 24, is detached. After protection layers 212 for protecting the LCD panels 27 and 28 are fixed at the lower/upper cases 21 and 22 respectively, the upper case 21 is fixed with the hinge 15 to be rotated so that the flip is completed.

Hereinafter, an operation of the backlight will be described according to the present invention.

When power is applied to the control unit 261, light is emitted from the LED 262 under control of the flexible PCB 25 and the light is collected at the light collecting unit 231. The collected light is transmitted into the light guide plate 23 and the transmitted light is distributed into the inside and outside LCD panels 27 and 28 through the translucent fluorescent films 232A and 232P. The light is emanated through the protecting layers 212 fixed to the lower and upper cases 21 and 22. Accordingly, a user can easily identify messages and the other functions at a dark place by applying the light.

Also, the LED light source may be substituted with not only LED light sources of a STN (Supertwist Nematic) LCD and a TFT (thin film transistor) LCD, but also a fluorescent lamp.

As the backlight, which can illuminate the inside and outside LCD panels with light emitted from one LED, is used, a thickness of the mobile communication terminal can be reduced and a fabricating process can be simplified so that a fabrication cost can be reduce. Accordingly, productivity can be increased and competitive goods are expected.

While the present invention has been described with respect to the particular embodiments, it will be apparent to those skilled in the art that various changes and modifications may be made without departing from the spirit and scope of the invention as defined in the following claims.

What is claimed is:

1. A folder-type mobile communication terminal having a double-sided LCD, comprising:
    a first LCD panel;
    a second LCD panel; and
    a backlight means, which is interposed between the first and second LCD panels, for bi-directionally illuminating the first and second LCD panels, wherein the backlight means includes:
    a single light emitting means for emitting light; and
    a single light guide plate for distributing the light emitted from the light emitting means to the first and second LCD panels.
2. The folder-type mobile communication terminal as recited in claim 1, wherein the backlight means further includes two translucent films disposed on both planes of the single light guide plate.

3. The folder-type mobile communication terminal as recited in claim 2, wherein the single light guide plate dominantly distributes uniform light to the first LCD and generates leakage light toward the second LCD.

4. The folder-type mobile communication terminal as recited in claim 3, wherein the two translucent films include:
   a first translucent film disposed between one plane of the single light guide plate and the first LCD panel for uniformly transmitting the uniform light to the first LCD panel; and
   a second translucent film disposed between the other plane of the single light guide plate and the second LCD panel for uniformly transmitting the leakage light to the second LCD panel, wherein a light transmissivity of the first translucent film is higher than that of the second translucent film.

5. The folder-type mobile communication terminal as recited in claim 4, wherein the backlight means further includes a light collecting means formed at an upper portion of the single light guide plate for collecting the light emitted from the light emitting area.

6. The folder-type mobile communication terminal as recited in claim 4, further comprising a power control means for controlling power of the first and second LCD panels, wherein the power control means controls that the first and second LCD panels are simultaneously or selectively illuminated according to flip stats, opening and shutting of the flip of the folder-type mobile communication terminal.

7. The folder-type mobile communication terminal as recited in claim 4, wherein the light emitting means includes three colors (R, G and B) LCD emitting device.

8. The folder-type mobile communication terminal as recited in claim 4, wherein the light emitting means is substantially a light emitting diode (LED).

9. The folder-type mobile communication terminal as recited in claim 4, wherein the light emitting means is substantially a fluorescent lamp.

\* \* \* \* \*